Feb. 17, 1959    C. C. McCAIN ET AL    2,873,516
ALIGNING FIXTURE FOR ASSEMBLING PARTS OF A MAGNETRON TUBE
Filed Sept. 14, 1954    2 Sheets-Sheet 1
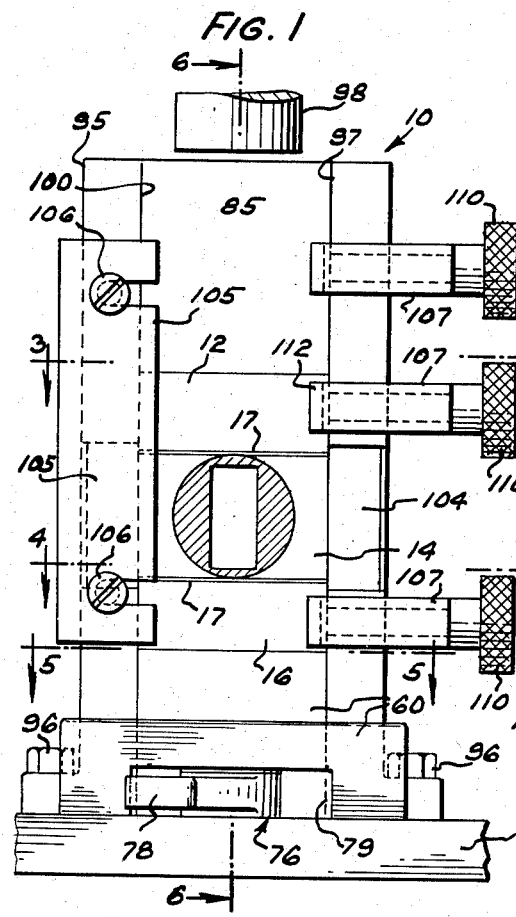
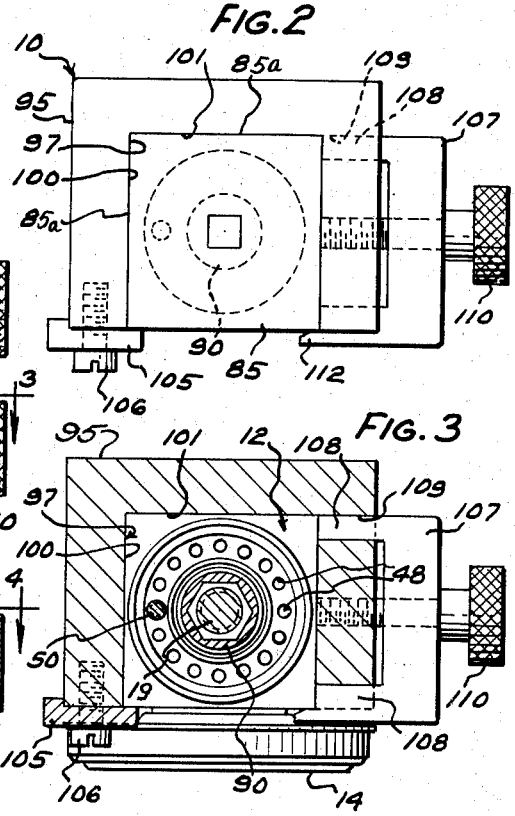
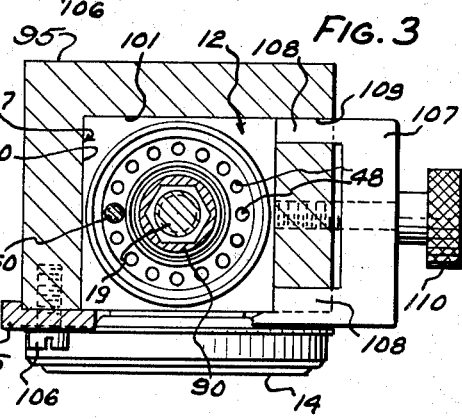
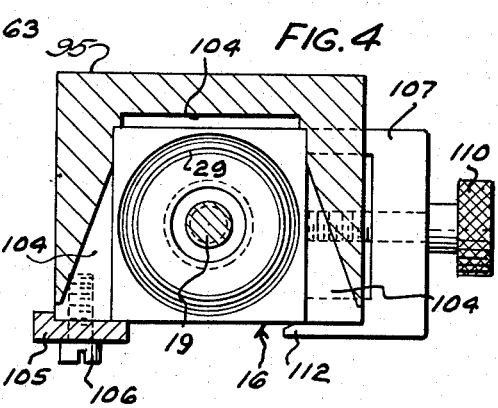
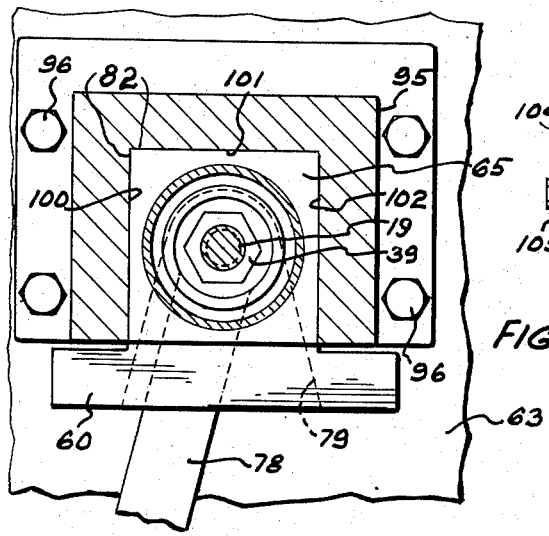
INVENTORS
C. C. McCAIN
E. SIRP
BY C. D. Hamilton
ATTORNEY

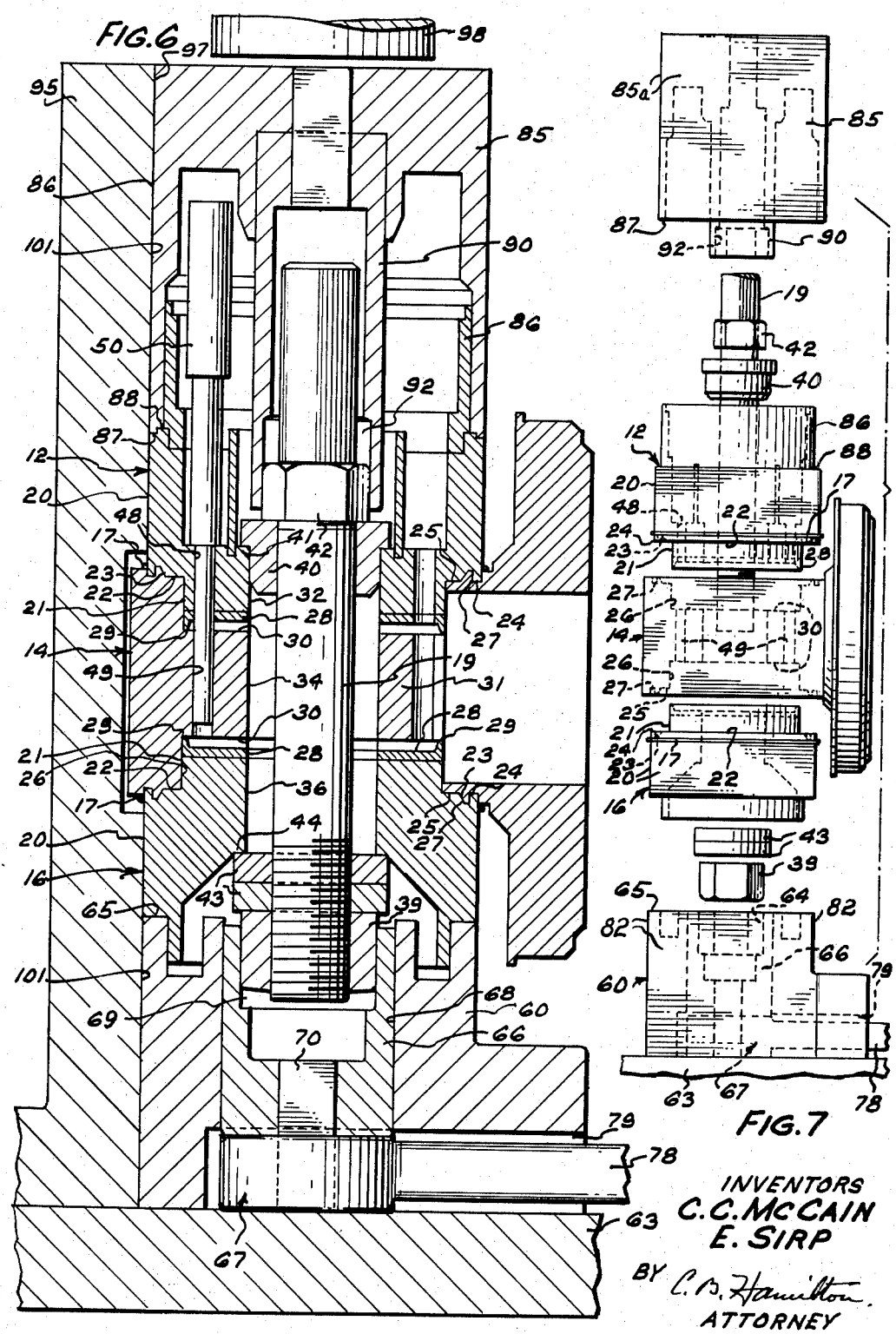
Feb. 17, 1959     C. C. McCAIN ET AL     2,873,516
ALIGNING FIXTURE FOR ASSEMBLING PARTS OF A MAGNETRON TUBE
Filed Sept. 14, 1954     2 Sheets-Sheet 2
INVENTORS
C. C. McCAIN
E. SIRP
BY C. B. Hamilton
ATTORNEY

United States Patent Office 2,873,516
Patented Feb. 17, 1959

2,873,516

ALIGNING FIXTURE FOR ASSEMBLING PARTS OF A MAGNETRON TUBE

Cecil C. McCain, Glen Ellyn, and Emil Sirp, Naperville, Ill., assignors to Western Electric Company, Incorporated, New York, N. Y., a corporation of New York Application September 14, 1954, Serial No. 455,872

7 Claims. (Cl. 29—287)

This invention relates to a fixture for assembling parts and more particularly to a fixture for aligning and assembling a pair of pole pieces to an anode member of a magnetron.

An object of the invention is to provide a fixture for supporting and aligning a plurality of superposed parts to permit them to be assembled and retained in aligned relationship to each other.

Another object of the invention is to provide a device for aligning and supporting an assembly or superposed apertured parts to permit them to be compressed and clamped to maintain the parts in compressed assembled relation.

A device illustrating certain features of the invention may include a lower block slidably supported on a platen of a press and having a seat engageable with one of the parts for supporting a plurality of the parts in superposed assembled relation with a ring of brazing material at the junctures thereof and the lower block may have a ratchet-type socket wrench mounted therein with the socket member thereof engageable with a nut on a bolt passing through the assembly of parts. An upper block has a seat engageable with the uppermost part of the assembly of parts and has a fixed socket member engageable with the bolt for preventing rotation thereof while the nut is being tightened thereon. The assembly of parts supported on the lower block and with the upper block thereon is moved into a vertical aligning recess of an upright frame mounted on the platen and the parts are clamped therein for aligning them relative to each other and the ram of the press is operable to move the upper block downwardly toward the lower one and press the parts therebetween into tight engagement with each other, after which the socket wrench is actuated to tighten the nut on the bolt to clamp the parts in compressed assembled relation preparatory to heating the assembly in a furnace to bond the parts to one another by melting the brazing ring.

Other objects and advantages of the invention will become apparent by reference to the following detailed description and the accompanying drawings, illustrating a preferred embodiment thereof, in which Fig. 1 is a front elevational view of the device shown mounted on the platen of the press with the assembly of parts therein aligned with the ram of the press;

Fig. 2 is a top plan view of the device;

Figs. 3, 4, and 5 are horizontal sectional views taken on the lines 3—3, 4—4, and 5—5, respectively, of Fig. 1;

Fig. 6 is an enlarged vertical sectional view of the device taken on the line 6—6 of Fig. 1; and Fig. 7 is an exploded view of the upper and lower compressor blocks with parts to be assembled therebetween.

The present assembling fixture or device 10 was designed to assemble a plurality of parts 12, 14, and 16 in superposed relation one to another with rings of brazing material 17 at their junctures and with the parts 12 and 16 in accurately aligned relation to each other and the intermediate part 14 to permit the assembly of parts to be placed in a press and compressed into tight assembled relation and for tightening a nut 39 on the end of a bolt 19 passing through the parts for clamping the parts in compressed assembled relation preparatory to brazing the parts to each other. As shown herein the parts 12, 14, and 16 are components of a magnetron tube, the parts 12 and 16 being pole pieces which are to be assembled to opposite sides of the anode shell 14 and brazed thereto.

The pole pieces 12 and 16 of steel have portions of rectangular cross section forming flat vertical outer faces 20 and the ends of the pole pieces 12 and 16 adjacent the anode shell 14 are circular, the portion 21 being of reduced diameter and forming a shoulder 22 which has an annular groove 23 and an annular tongue 24. The reduced portions 21 of the pole pieces fit in cylindrical recesses 26 in opposite ends of the anode shell 14 and the annular tongues 24 of the pole pieces fit into annular grooves 27 in the ends of the anode shell 14 and are adapted to be pressed into tight engagement with the ends thereof so that when the solder rings 17 are fused a tight seal is formed between the anode member and the pole pieces. A filler member 28 of copper is bonded to the end of each of the pole pieces 12 and 16 and each has a sharp annular flange 29 extending axially therefrom which is adapted to be crushed into engagement with flat surfaces 30 of the anode 31 of the anode shell to effect a seal therewith.

The parts 12, 14, and 16 are provided with central apertures 32, 34, and 36, respectively, Fig. 6, and the parts are adapted to be clamped in assembled relation by the bolt 19 passing therethrough and the nut 39. A shouldered bushing 40 engages a shoulder 41 of the pole piece 12 and the head 42 of the bolt 19, and a pair of washers 43 bear against the shoulder 44 of pole piece 16 and engage the nut 39 as it is tightened on the bolt to clamp the parts 12, 14, and 16 in assembled relation. The pole piece 12 and the anode 14 have a plurality of apertures 48 and 49, respectively, which are arranged in a circle about the axis of the apertures 32 and 34, and the apertures 48 and 49 are positioned in coaxial alignment with each other by inserting aligning pins 50 therein.

The fixture or device 10 for holding the parts 12, 14, and 16 in alignment while they are being pressed one against the other comprises a lower compressor block or supporting member 60 having a flat lower face adapted to rest on a flat upper face of a platen 63 of a hydraulic press or other flat supporting surface. At its upper end the lower block 60 has an irregular surface forming a seat 65 conforming to a portion of the lower end of the pole piece 16 for supporting it thereon. A socket member 66 of a well known ratchet-type of socket wrench 67 is rotatably mounted in a central aperture 68 and has a socket 69 for receiving the nut 39 therein. The socket member 66 is connected through a rectangular connector element 70 to the head of the wrench 67 which has a handle 78 which extends through a recess 79 and may be manually oscillated to tighten the nut 39 on the bolt 19. The lower block 60 has a rectangular cross section of the same size as that of the pole pieces 12 and 16 and is bounded by a plurality of flat vertical faces 82.

An upper hollow compressor member or block 85 has a rectangular cross section of the same size as that of the lower block 60 and has a plurality of vertical flat outside faces 85a. The hollow block 85 telescopes over the skirt 86 of the upper pole piece 12 and has a seat 87 at its lower edge engageable with a shoulder 88 on the pole piece. A tubular socket member 90 fixed to the upper portion of the block 85 along its central axis has a socket 92 for receiving the head 42 of the bolt and holding it against rotation.

A vertically disposed aligning frame 95 secured to the platen 63 by a plurality of screws 96 has a channel-shaped cross section forming a rectangular vertically disposed recess 97 for receiving the assembled parts 12, 14, and 16 and the compressor blocks 60 and 85 in superposed relation below and in alignment with the ram 98 of the press as shown in Figs. 1 and 6. The flat surfaces 20, 20 of the pole pieces 12 and 16, and the surfaces 82 and 86 of the blocks 60 and 85, respectively, are adapted to engage flat vertical aligning surfaces 100 and 101 in the slot 97 of the aligning frame 95. Recesses 104 are formed in the aligning frame 95 to provide clearance for the anode shell 14.

Locking plate 105 is secured to the forward face of the aligning frame 95 by screws 106 with a portion thereof in engagement with parts 12, 14, and 16 for holding them against the aligning surface 101 of the aligning frame 95. U-shaped clamps 107 having a pair of straight legs 108 slidable in recesses 109 in the aligning frame 95 are adapted to engage one side of the pole pieces 12 and 16 and the upper compressor block 85 and are actuated by hand screws 110 threaded in the frame 95 for holding the pole pieces 12 and 14 and the upper block 85 in tight engagement with the aligning face 100 of the aligning frame 95 to align flat outside faces 20 of the pole pieces 12 and 16 in parallelism with each other. The U-shaped clamping members 107 have fingers 112 (Figs. 2–4) which engage the pole pieces 12 and 16 and serve to prevent lateral displacement thereof.

In the assembling operation the pole pieces 12 and 16 are applied to opposite sides of the anode shell 14 with the flat sides 20 of the pole pieces 12 and 14 in approximate parallelism after which the bolt 19, the spacers and washers 40 and 43, and the nut 39 are loosely applied thereto and the aligning pins 50 inserted in the apertures 48 and 49 to coaxially align them. The loosely assembled parts 12, 14, and 16 are then placed on the lower compressor block 60 with the nut 39 fitting in the socket member 66 of the wrench 67, and the upper compressor block 85 is then placed on the upper pole piece 20 with the flat faces 86 in substantial alignment with faces 20 of the pole piece 12. The superposed parts 60, 16, 14, 12, and 85 are then moved into the aligning recess of the frame 95 and the plate 105 applied to the frame to urge the pole pieces against the aligning wall 101, and the hand screws 110 are then manipulated to actuate the clamping members 107 to clamp the pole pieces 12 and 16 and the upper compressor block 85 against the aligning wall 100 of the frame 95. The press may then be actuated, causing the ram 98 to apply a predetermined pressure to the upper end of the compressor block 85 and move it toward the lower compressor block 60 to compress the pole pieces 12 and 16 against the anode shell 14 and crush the sharp annular edges 29 of the copper filler members 28 against the faces 30 of the anode 31 while maintaining the pole pieces 12 and 16 against the aligning surfaces 100 and 101 and in a predetermined alignment relative to each other. While the ram 98 has the parts under pressure, the handle 78 of the ratchet wrench 67 is actuated to tighten the nut 39 on the bolt 19 to maintain the pole pieces 12 and 16 in tightly clamped engagement with the anode shell 14. The ram is then elevated and the clamping plate 105 and the clamping members 107 are released. The parts 60, 16, 14, 12, and 85 are then removed from the aligning frame 96 and the compressor blocks 60 and 85 removed from the assembly of parts 12, 14, and 16 which are held in accurately aligned and compressed relation to each other preparatory to being heated in a furnace to cause the brazing rings 17 to bond the parts 12, 14, and 16 together.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for aligning and assembling a plurality of loosely positioned parts including an upper part and a lower part and for tightening a clamping means associated with the parts for clamping the parts in assembled relation comprising a platen, a ram, a lower member slidably supported on said platen and having a seat engageable with the lower part for supporting the assembly of parts, an upper member engageable with the ram and having a seat engageable with the upper part of said assembly, means on the platen for aligning the members and assembly of parts relative to each other and beneath the ram whereby the ram may be actuated to compress the parts, and means on one of said members for actuating the clamping means on said assembly of parts to retain the assembled parts in their compressed state.

2. A fixture for aligning and supporting a plurality of apertured parts including a lower part and an upper part in superposed relation and for tightening a locking bolt extending through the parts and having nut and head elements thereon comprising a platen, a ram, a lower block slidably supported on said platen and having a seat engageable with the lower part for supporting the assembly of parts, an upper block engageable with the ram of said press and having a seat engageable with the upper part of said assembly of parts, a ratchet-type socket wrench mounted on one of said blocks and having a rotatable socket member engageable with one of said bolt elements, a fixed socket member in the other block engageable with the other bolt element for holding it against rotation, a stationary aligning member on said platen having a vertically disposed recess for aligning the blocks and assembly of parts therein relative to each other and to said ram and for holding said blocks against rotation, and means on the aligning member for holding said blocks and parts in said aligning member.

3. A fixture for aligning and supporting a plurality of apertured parts while the parts are being compressed and for tightening a locking bolt extending through the parts and having nut and head elements thereon comprising a platen, a ram, a pair of blocks having seats engageable with oppoiste ends of said assembly of parts for supporting said assembly therebetween, one of said blocks having a ratchet-type socket wrench mounted thereon with a rotatable socket member engageable with one of the nut or the head elements of said bolt, and the other block having a fixed socket member engageable with the other element of the bolt for holding it against rotation, means on the platen for aligning the assembly of parts and said blocks with the ram of the press and for holding the upper and lower blocks against rotation whereby said ram may be actuated to move the blocks towards each other to compress said assembly of parts and whereby said socket wrench may be actuated to tighten the nut and bolt to clamp the parts in compressed relation.

4. A fixture for aligning and supporting a plurality of apertured parts while they are being pressed together and for tightening a nut on a locking bolt extending therethrough comprising a platen, a ram, a lower block having a seat engageable with one end of said assembly of parts for supporting said assembly thereon and having a ratchet-type socket wrench with a rotatable socket member engageable with the nut on one end of said bolt, an upper block having a seat engageable with the other end of said assembly and having a fixed socket member engageable with the bolt for holding it against rotation, a member on said platen having a recess for receiving and aligning the parts of the assembly and said blocks relative to each other and the ram and for holding the parts and the blocks against rotation whereby said ram may be actuated to move the blocks towards each other to compress said assembly of parts and said socket wrench may be actuated to tighten the nut on the bolt to clamp the parts in compressed assembled relation.

5. A fixture for aligning and supporting a plurality of apertured parts while they are being compressed and for tightening a nut on a locking bolt extending therethrough comprising a platen, a ram, a lower block slidable on the platen and having a seat engageable with one end of said assembly of parts for supporting said assembly thereon and having a ratchet-type socket wrench mounted thereon with a socket member engageable with the nut on one end of said bolt, an upper block having a seat engageable with the other end of said assembly and having a fixed socket member engageable with the bolt for holding it against rotation, means on said platen for positioning the assembly of parts and said blocks in alignment with the ram of the press and for holding the upper and lower blocks against rotation whereby said ram may be actuated to move the blocks towards each other to compress said assembly of parts and said socket wrench may be actuated to tighten said nut on the bolt to clamp the parts in compressed assembled relation.

6. A fixture for aligning an assembly of superposed parts having flat lateral faces and for tightening a nut on a locking bolt extending through the parts comprising a platen, a ram, a first block having a seat engageable with one end of said assembly of parts and having a ratchet-type socket wrench therein with a rotatable socket member engageable with a nut on one end of said bolt and with an actuating handle projecting from said block, said block having a clearance opening for movement of the handle, a second block having a seat engageable with the other end of said assembly of parts and having a fixed socket member engageable with the bolt for holding it against rotation, one of said blocks on the assembly of parts being supported on said platen and the other block being engageable with the ram, a stationary aligning member on said platen having a pair of flat aligning surfaces disposed in transverse relation to each other for receiving the blocks and assembly of parts in upright position in alignment with the ram and with a pair of the flat surfaces of the parts in engagement with said flat aligning surfaces, means on the aligning member for urging said parts with the flat surfaces thereof in tight engagement with said flat aligning surfaces to align the parts relative to each other, and means on the aligning member for preventing rotation of said blocks whereby said ram may be actuated to compress the parts and the wrench may be actuated to tighten the nut on said bolt to clamp the assemblies of parts in compressed assembled relation.

7. A fixture for aligning and supporting a pair of apertured pole pieces on opposite ends of an apertured anode member wherein the pole pieces have flat lateral faces and for tightening a nut on a locking bolt extending through the pole pieces and the anode member comprising a platen, a lower block slidable on said platen having a seat engageable with the lower pole piece for supporting the assembly of pole pieces and anode member thereon and having a central recess and a lateral recess therein, a ratchet type socket wrench in said block having a socket member disposed in said central recess and engageable with said nut on one end of said bolt and having an actuating handle projecting from said lateral recess, an upper block having a seat engageable with the upper pole piece of said assembly of pole pieces and anode member and having a fixed socket member engageable with the head of the bolt for holding it against rotation, a ram movable toward and away from said platen, a stationary upright aligning member on said platen having a pair of flat vertical aligning surfaces disposed in transverse relation to each other for receiving said upper and said lower blocks and the assembly of pole pieces and anode member in superposed relation below and in alignment with the ram and with a pair of the flat surfaces of the pole pieces in engagement with said flat aligning surfaces, means mounted on the aligning member for urging said pole pieces with the flat surfaces thereof in tight engagement with said flat aligning surfaces to align the pole pieces relative to each other and to the anode member, and means on the aligning member for preventing rotation of said blocks whereby said ram may be actuated to compress the pole pieces and the anode against each other and the wrench may be actuated to tighten the nut on said bolt to clamp the assemblies of the pole pieces and anode member in compressed assembled relation.

References Cited in the file of this patent

UNITED STATES PATENTS

| | | |
|---|---|---|
| 1,508,342 | Lee | Sept. 9, 1924 |
| 2,044,818 | Spase | June 23, 1936 |
| 2,327,352 | Hoover | Aug. 24, 1943 |
| 2,553,749 | Clark et al. | May 22, 1951 |
| 2,602,217 | Sweeney et al. | July 8, 1952 |